2,849,340

FILTER TREATMENT

Joseph B. Sutton, Liftwood, Del., and John V. P. Torrey, Richland, Wash., assignors to the United States of America as represented by the United States Atomic Energy Commission No Drawing. Application January 7, 1946
Serial No. 639,696

2 Claims. (Cl. 134—41)

This invention relates to an improved method of reconditioning filters.

It is an object of the present invention to provide an improved process for reconditioning filters having a solid acid resistant inorganic filter medium.

It is a particular object of the present invention to provide an improved process for reconditioning solid sintered filters of the fused aluminum oxide type, particularly when used to filter precipitates containing bismuth phosphate, such as bismuth phosphate precipitates employed for removing radioactive materials from solutions.

There are numerous instances wherein it is desirable to remove precipitates such as bismuth phosphate from an acid resistant solid inorganic filter medium, for example, in the removal of plutonium from solutions of neutron irradiated uranium as more fully described in copending application U. S. Serial No. 519,714, by Stanley G. Thompson et al., filed January 26, 1944, now Patent No. 2,785,951. Briefly, such a method involves the formation of bismuth phosphate in a dilute solution of plutonium, uranium, and the various fission products produced in the formation of said plutonium. The bismuth phosphate precipitate when formed under such conditions carries the plutonium contained in such a solution along with it. Thereafter, the precipitate is separated by filtration and dissolved usually in nitric acid after which the plutonium is oxidized to $PuO_2^{++}$ in which state of oxidation it is soluble in the presence of bismuth phosphate. Under these conditions the plutonium remains in solution and the fission products are removed when bismuth phosphate is formed therein. Thereafter, the dissolved plutonium is reduced to a valent state not greater than +4 and removed from solution along with bismuth phosphate when the latter is formed therein. This procedure may be repeated and the plutonium purified further if considered necessary or desirable.

When bismuth phosphate precipitates are filtered on a solid acid resistant inorganic filter medium and the precipitate is then removed either by dissolving in acid, such as nitric acid, or by physical means such as scraping or blowing with air, and additional filtrations are carried out, the filtration rate as measured in gallons per hour per square foot of filter surface markedly decreases after a number of cycles. When this occurs no amount of removal treatment such as flushing with hot nitric acid will entirely recondition the filter. Even boiling the filter medium in hot nitric acid reconditions the filter for only a comparatively short time. This is particularly true when bismuth phosphate precipitated in nitric acid solution is filtered on a fused alumina filter.

In accordance with the present invention it has been found that concentrated sulfuric acid, particularly 104 percent sulfuric acid, is an effective agent for reconditioning solid acid resistant inorganic filters. It has been found that sulfuric acid of such concentration is particularly useful when used to treat fused aluminum oxide type filters on which a bismuth phosphate containing precipitate has been filtered.

Sulfuric acid of the above general concentrations (commonly known as oleum) is used in accordance with the present invention after a number of cycles of filtering bismuth phosphate followed by the removal thereof with nitric acid. To recondition the filter, oleum is allowed to stand on the filter, preferably at room temperature, for several hours and then drawn through the filter medium.

The present invention may be more specifically illustrated by the examples which follow:

EXAMPLE 1

A series of 19 consecutive filtrations of one liter quantities of $BiPO_4$ slurries containing fission products were carried out with subsequent solution of each precipitate on a fused aluminum oxide filter. The rate of filtration was determined in each cycle. For each cycle the following procedure was employed: 224 g. of uranyl nitrate hexahydrate was dissolved in distilled water and 27.2 cc. of concentrated $H_2SO_4$ was added. Next 10 cc. of a solution 10 N in $HNO_3$ containing 250 g. $Bi^{+++}$ per liter was added. The volume of the solution was then adjusted to 1 liter. The solution was heated with stirring to 75° C. and 27.2 cc. of 85 percent $H_3PO_4$ was added slowly. The temperature was maintained at 75° C. during the addition and a forty-five minute digestion period. The slurry was cooled to room temperature, filtered and the filtrate collected in a flask evacuated to 15" of Hg pressure. For the first seven filtrations the vacuum varied somewhat but thereafter it was controlled to ±1". After the filtration the precipitate was dissolved on the filter. This was accomplished by adding 40 cc. of 10 N $HNO_3$ at room temperature and stirring for ten minutes. The resulting solution was drawn through the filter plate and another 40 cc. of acid was added, stirred for ten minutes and filtered. Finally 31 cc. of acid was added, stirred for ten minutes and drawn through the filter. During the first 19 filtrations the filter was filled with water when it was left over night. The table below shows the filtration rates for the first 19 filtrations.

*Table I*

| Run No. | Filtration rate, Gal. per Sq. Ft. per Hr. |
|---|---|
| 1 | 695 |
| 2 | 550 |
| 3 | 419 |
| 4 | 406 |
| 6 | 300 |
| 7 | 444 |
| 8 | 323 |
| 9 | 514 |
| 10 | 301 |
| 11 | 346 |
| 12 | 416 |
| 13 | 384 |
| 14 | 136 |
| 15 | 196 |
| 16 | 105 |
| 17 | 36.4 |
| 18 | 22.8 |
| 19 | 19.6 |

After these filtrations the filter was treated with 100 cc. of warm (50° C.) 10 N HNO₃ as follows: 50 cc. were added, stirred for ten minutes and filtered. An additional 40 cc. was added, stirred, and filtered. This treatment increased the water flow rate from 19.8 to 57 gal. per square foot per hour. Three liters of 10 N nitric acid at 50° C. was then rapidly put through the filter. This treatment increased the water flow rate to 510 gallons per square foot per hour. Four more bismuth phosphate filtration cycles similar to those described above were made and the rate dropped very rapidly as shown in the table below.

Table II

| Run No. | Filtration rate, Gal. per Sq. Ft. per Hr. |
|---|---|
| 20 | 398 |
| 21 | 142 |
| 22 | 131 |
| 23 | 35.4 |

EXAMPLE 2

A series of 19 bismuth phosphate precipitates prepared as described in Example 1 were filtered and each precipitate was dissolved on the filter as in Example 1 with the exception that the dissolving acid was held at 50–70° C. During the solution of the precipitate in runs from 1 to 13 inclusive warm 10 N nitric acid was held on the filter for two hours between filtrations. In runs 14 to 19 inclusive warm 10 N nitric acid was allowed to drip through the filter under gravity flow for two hours between filtrations, the filtration rates were as follows:

Table III

| Run No. | Filtration rate, Gal. per Sq. Ft. per Hr. |
|---|---|
| 1 | 410 |
| 2 | 588 |
| 3 | 422 |
| 4 | 287 |
| 5 | 397 |
| 6 | 415 |
| 7 | 320 |
| 8 | 254 |
| 9 | 346 |
| 10 | 228 |
| 11 | 184 |
| 12 | 286 |
| 13 | 219 |
| 14 | 181 |
| 15 | 182 |
| 16 | 114 |
| 17 | 103 |
| 18 | 130 |
| 19 | 78.5 |

Attempts to recondition the filters with hot or cold 89 to 95% nitric acid were unsuccessful. The filter was finally reconditioned by allowing 104% sulfuric acid to stand in contact therewith for four hours at room temperature. After reconditioning, four runs of plain water were passed through the filter. Following this, 38 consecutive filtration cycles of bismuth phosphate precipitates similar to those described in Example 1 were made. The bismuth phosphate precipitates were dissolved in warm 10 N nitric acid and warm 10 N nitric acid was allowed to remain in contact with the filter for twenty minutes between filtrations. The results are shown in Table IV.

The average of the last five runs was 486 gal. per sq. ft. per hr. compared to an average of 686 gal. per sq. ft. per hr. for the first five runs, a reduction of only 28.7 percent in filration rate in 38 runs for the oleum treated filter.

A comparison with the results using only nitric acid in Table I shows that the average of the first five runs is 474 gal. per sq. ft. per hr. and the average of the last five runs is 76 gal. per sq. ft. per hr., a reduction of 84 percent in 19 runs.

Table IV

| Run No. | Filtration rate, Gal. per Sq. Ft. per Hr. |
|---|---|
| 1 | 760 |
| 2 | 683 |
| 3 | 595 |
| 4 | 816 |
| 5 | 578 |
| 6 | 840 |
| 7 | 650 |
| 8 | 617 |
| 9 | 654 |
| 10 | 585 |
| 11 | 553 |
| 12 | 617 |
| 13 | 638 |
| 14 | 628 |
| 15 | 710 |
| 16 | 577 |
| 17 | 659 |
| 18 | 803 |
| 19 | 870 |
| 20 | 593 |
| 21 | 600 |
| 22 | 886 |
| 23 | 675 |
| 24 | 557 |
| 25 | 501 |
| 26 | 555 |
| 27 | 438 |
| 28 | 710 |
| 29 | 476 |
| 30 | 328 |
| 31 | 328 |
| 32 | 584 |
| 33 | 563 |
| 34 | 583 |
| 35 | 526 |
| 36 | 572 |
| 37 | 346 |
| 38 | 402 |

After the series of 38 filtrations described above the filter was again treated with 104 percent oleum thereby increasing the rate with plain water to 928 gallons per sq. ft. per hr. A series of filtration cycles of bismuth phosphate containing radioactive fission products was then started. The filtering and dissolving procedures were the same as those used in Example 2 above. The results are shown in Table V.

The average of the first five runs was 629 gal. per sq. ft. per hr. and the average of the last five runs was 459 gal. per sq. ft. per hr., a reduction of 27 percent in filtration rate after thirty cycles.

In order to determine whether the oleum had increased the pore size of the fused aluminum oxide filter plate a portion of the filtrate was centrifuged. No precipitate was found. In addition there was no increase in the maximum filtration rate after using the plate in approximately 200 filtration cycles including occasional treatment with oleum. This indicates that the oleum probably does not change the pore size of the fused aluminum filter plate.

As pointed out above, it has been found in accordance with the present invention, that solid acid resistant inorganic filter media can be reconditioned by treatment with oleum. These filters have been used to filter bismuth phosphate containing precipitates followed by removal of the bismuth phosphate. Among such solid acid resistant filter media the most important is fused alumina. Other filter media such as sintered glass, porous carbon and cloth woven from glass, asbestos, or other acid resistant fiber may be used.

Table V

| Run No. | Filtration rate, Gal. per Sq. Ft. per Hr. |
|---|---|
| 1 | 732 |
| 2 | 765 |
| 3 | 468 |
| 4 | 515 |
| 5 | 667 |
| 6 | 657 |
| 7 | 647 |
| 8 | 513 |
| 9 | 474 |
| 10 | 470 |
| 11 | 518 |
| 12 | 578 |
| 13 | 549 |
| 14 | 436 |
| 15 | 562 |
| 16 | 528 |
| 17 | 588 |
| 18 | 653 |
| 19 | 588 |
| 20 | 498 |
| 21 | 654 |
| 22 | 520 |
| 23 | 425 |
| 24 | 608 |
| 25 | 430 |
| 26 | 490 |
| 27 | 427 |
| 28 | 419 |
| 29 | 519 |
| 30 | 438 |

It will be apparent to those skilled in the art that modifications of the present invention exist and, therefore, any such modifications which would naturally occur to those skilled in the art are to be considered as lying within the scope of this invention.

What is claimed is:

1. In a process for reconditioning a fused aluminum oxide filter which has become substantially ineffective as a filtering medium by the accretion of bismuth phosphate in the pores of said medium, the improvement which comprises contacting said aluminum oxide filter with oleum and maintaining said contact for a substantial period of time.

2. In a process for reconditioning a fused aluminum oxide filter which has become substantially ineffective as a filtering medium for solutions containing bismuth phosphate, by accretion of bismuth phosphate in the pores of said medium, the improvement which comprises contacting said medium with oleum for from two to four hours and then drawing the oleum through said filter.

References Cited in the file of this patent

UNITED STATES PATENTS 2,228,026    Abrahams _____ Jan. 7, 1941